United States Patent [19]
Wolfe et al.

[11] Patent Number: 6,161,142
[45] Date of Patent: Dec. 12, 2000

[54] METHOD AND SYSTEM FOR USING A COMMUNICATION NETWORK TO SUPPLY TARGETED STREAMING ADVERTISING IN INTERACTIVE MEDIA

[75] Inventors: Robert L. Wolfe, New Rochelle; Jeffrey Pinals, New York, both of N.Y.

[73] Assignee: The MusicBooth LLC, New Rochelle, N.Y.

[21] Appl. No.: 09/480,093

[22] Filed: Jan. 10, 2000

Related U.S. Application Data

[63] Continuation of application No. 09/333,094, Jun. 15, 1999, Pat. No. 6,038,591, which is a continuation of application No. 08/822,313, Mar. 21, 1997, Pat. No. 5,931,901.
[60] Provisional application No. 60/032,141, Dec. 9, 1996.

[51] Int. Cl.[7] .................................................. H04N 1/413
[52] U.S. Cl. .......................... 709/230; 709/206; 709/212
[58] Field of Search ................................... 709/206, 212, 709/230

[56] References Cited

U.S. PATENT DOCUMENTS

| | | |
|---|---|---|
| 5,155,591 | 10/1992 | Wachob . |
| 5,319,455 | 6/1994 | Hoarty et al. . |
| 5,341,350 | 8/1994 | Frank et al. . |
| 5,355,302 | 10/1994 | Martin et al. . |
| 5,404,566 | 4/1995 | Wehrmeyer . |
| 5,491,838 | 2/1996 | Takahisa et al. . |
| 5,515,098 | 5/1996 | Carles . |
| 5,541,638 | 7/1996 | Story . |
| 5,572,442 | 11/1996 | Schulhof et al. . |
| 5,636,346 | 6/1997 | Saxe . |
| 5,652,615 | 7/1997 | Bryant et al. . |
| 5,661,516 | 8/1997 | Carles . |
| 5,682,525 | 10/1997 | Bouve et al. . |
| 5,704,017 | 12/1997 | Heckerman et al. . |
| 5,708,478 | 1/1998 | Tognazzini . |
| 5,721,827 | 2/1998 | Logan et al. . |
| 5,724,521 | 3/1998 | Dedrick . |
| 5,726,909 | 3/1998 | Krikorian . |
| 5,734,119 | 3/1998 | France et al. . |
| 5,758,257 | 5/1998 | Herz et al. . |
| 5,761,601 | 6/1998 | Nemirofsky et al. . |

*Primary Examiner*—Thomas R. Peeso
*Attorney, Agent, or Firm*—Gunster, Yoakley & Stewart.

[57] ABSTRACT

A system and method for delivering programmed music and targeted advertising messages to Internet based subscribers includes a software controlled microprocessor based repository in which the dossiers of a plurality of the subscribers are stored and updated, musical content and related advertising are classified and matched. A subscriber has an appropriate microprocessor based device capable of selecting information and receiving information from the Internet. The subscriber receives the programmed music and matched advertisements from the repository over the Internet.

48 Claims, 3 Drawing Sheets

METHOD AND SYSTEM FOR USING A COMMUNICATION NETWORK TO SUPPLY TARGETED STREAMING ADVERTISING IN INTERACTIVE MEDIA

CROSS REFERENCE TO RELATED APPLICATION

This is a continuation of application Ser. No. 09/333,094, filed Jun. 15, 1999, now U.S. Pat. No. 6,038,591, which is a continuation of application Ser. No. 08/822,313, filed Mar. 21, 1997, now U.S. Pat. No. 5,931,901, issued Aug. 3, 1999, which is based on and a claims priority to related U.S. Provisional Application No. 60/032,141, filed Dec. 9, 1996 and entitled PROGRAMMED MUSIC ON DEMAND FROM THE INTERNET.

BACKGROUND OF THE INVENTION

The present invention relates to a method and apparatus for transmitting and receiving programmed music to and from the Internet to subscribers of the programmed music, where the programmed music received by the subscribers includes targeted advertising according to predetermined criteria.

Public and network television and radio stations have for decades distributed proprietary copyrighted subject matter to the viewing and listening public without any charge due to the sponsorship and financing of these programs by various advertisers and/or governmental bodies. With television and radio broadcast, it is difficult if not impossible to deliver specific advertisement messages to finely selected audiences since audience targeting is possible only on the basis of broad geographical areas, e.g. the city of New York. It is impossible to target individuals, or individuals who share a common trait, e.g. a certain age range, educational background, etc.

In contrast, the Internet communicates (at least along a portion of its path) over personal communication lines, i.e. the telephone. This enables sending of tailored messages between the ultimate recipient of specific information and the source of the information, e.g. a website, an Internet Service Provider, etc. Traditionally, proprietary, e.g. copyrighted, information could be downloaded from the Internet. In most cases, charge accounts are established with an Internet Service Provider and the recipient of the proprietary data content pays for those services and/or information.

It is desirable to provide an Internet based system for the dissemination of valuable proprietary information free of charge, just as it is provided through network television and radio stations without any costs to the ultimate user/subscriber and with advertiser sponsorship thereof targeted to the subscriber.

SUMMARY OF THE INVENTION

Accordingly, it is a general object of the present invention to provide programmed music via the Internet to numerous subscribers without any charge to the subscribers.

It is a further object of the invention to provide programmed music to the general public in a manner which facilitates the bundling of such programmed music with advertisement copy tailored to the individual, to thereby underwrite the cost of supplying to members of the public valuable music and other data containing information.

It is a further object of the invention to provide advertisers a method of targeting music consumers meeting a profile designated by the advertiser which assures that the targeted music consumer receives a massage tailored for such consumer.

It is a further object of the invention to provide a system of the above type which is easy to use and implement.

The foregoing and other objects of the invention are realized in accordance with a preferred embodiment of the present invention which includes a software-controlled and microprocessor-based repository in which the dossiers of a plurality of subscribers are stored and updated. Subscribers use their own microprocessor-based systems to receive the programmed music and advertisements from the repository over the internet via their PCs.

The system handles advertisers by creating advertiser dossiers containing the amount of advertising time purchased by each advertiser, the amount used up and the amount remaining to be used ("available allocation"). The advertiser dossiers also contain specification of the desired consumer profiles to be targeted, specification of the category of products or services to be advertised, specification of any territorial or local time requirements or preferences, and a key to the location of the audio advertising content.

The present invention includes a repository, i.e. database, in which all musical content is stored and updated in either or both digital or analog form. Each item of music content is cataloged, defining the nature or category of the contents, the identity of the copyright holder or holders, the characteristics of the desired consumer or subscriber, the category of any product or service the advertising for which is not to be annexed to the content, and any limitation on the availability of the content. The content is converted to digital form for delivery over the Internet. The content may further be encoded to prevent unauthorized duplication and to identify the subscriber to whom the content is to be delivered.

The database also includes the identity of each copyright holder of the music content and an audio message identifying the artist and/or the copyright holders of each item of music content ("identity audio message").

A separate database is used to store and update the advertising content, again in either digital or analog form, later to be linked and transmitted to the ultimate consumer/subscriber. The advertisements are converted to digital form for delivery as audio messages over the Internet. The audio content of the database may include generic audio messages.

In operation, the subscriber selects the content which he or she desires to receive, and the content is placed in a queue for transmittal to the subscriber. Based on the profile of the content, a determination is made by the CPU based system as to which advertising copy—there may be many different ones—is appropriate to be delivered to the particular subscriber. The system then selects from a set containing numerous, different advertising messages those items that fit the subscriber and which also have "available allocation." From the advertising messages that can be transmitted, the next available advertising message is selected. In effect, advertisers buy the right to have their messages played a given number of times. If their available allocation of advertising play time has run out, they must replenish their account or their advertising message(s) will not be transmitted to subscribers.

Finally, the selected advertising message is affixed to the next generic message in the queue or to the applicable artist (composition) identity audio message. The system automatically links the advertising message, the generic or identity audio message and the subscriber selected content into a single data stream to be transmitted to the subscriber over the Internet. In constructing the stream, the system overlays the generic or identity audio message onto the music content so that, when delivered, the audio generic message and the audio content can both be heard by the subscriber simultaneously. The completed data stream is then delivered to the subscriber in a single, inseparable stream of data packets over the Internet.

Other features and advantages of the present invention will become apparent from the following description of the invention which refers to the accompanying drawings.

BRIEF DESCRIPTION OF THE DRAWING

For the purpose of illustrating the invention, there is shown in the drawings a form which is presently preferred, it being understood, however, that the invention is not limited to the precise arrangement and instrumentalities shown.

DETAILED DESCRIPTION OF THE INVENTION

In general terms, the present invention comprises a software controlled CPU, e.g. a microprocessor, based repository in which the dossiers of a plurality of subscribers are stored and updated. The information contained in the dossiers includes the type of music that the subscribers enjoy, the buying habits of the subscribers and the musical selections previously or simultaneously made by the subscribers.

Preferably, the subscribers receive the programmed music and advertisements from the repository over the Internet. However, the invention is applicable to communications between system and subscribers that use non-Internet channels, e.g. cable, direct broadcast, or any means of communication provided the method of communication permits delivery of an identified audio and/or audio video message to an identified specific subscriber. The specific musical material and advertisements transmitted may vary as a function of the information contained in the dossiers of the subscribers. In addition, the dossiers may change from time to time with a resulting change in music and advertisement programming. Further, the programmed music and advertisements may change as a function of the time of year or other conditions.

Figure 1:
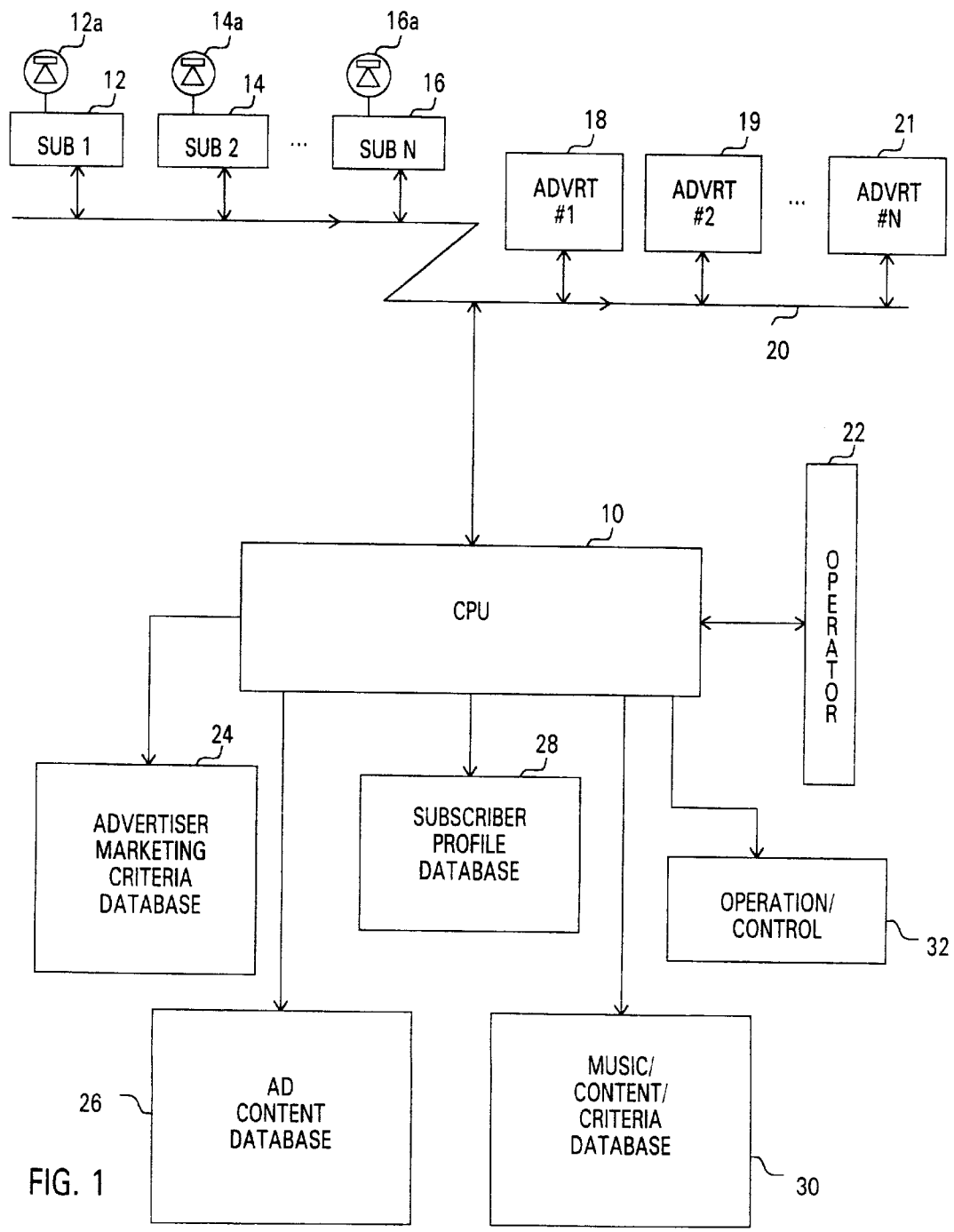
FIG. 1 is a block diagram of the basic system hardware arrangement of the present invention.

Referring to FIG. 1, the physical hardware/software configuration of the present invention preferably comprises a central processing unit (CPU) 10 which interfaces via the Internet 20 with a plurality of subscriber operating PCs 12, 14 . . . 16 (or other device capable of receiving individualized content for audio and/or video production) which respectively have speakers 12a, 14a . . . 16a to play programmed music or other audio information which is transmitted to them via the Internet 20. As already explained, in accordance with the present invention, the music being transmitted over the Internet to the subscribers is bundled with targeted advertising material in the form of audio messages tailored to the subscriber or musical profile paid for by advertisers 18, 19 . . . 21.

The CPU 10 may be any type of computer system, for example a mainframe, a server-based system of PCs, a stand-alone microprocessor and the like. The CPU 10 has the usual operator interface, e.g. a keyboard 22 and complement of memory and IO devices (not shown). Of significance here is that the CPU 10 maintains a plurality of databases including an advertisers/marketing criteria database 24 in which it stores the advertising preferences of the advertisers 18, 19 . . . 21, e.g. the type of subscribers that these advertisers would like to reach, their geographic locations and the system usage privileges and/or credit balance of these advertisers.

The database 26 stores the advertisement content, i.e. the actual advertising copy of the various advertisers 18, 19 . . . 21. Note that any one of the advertisers 18, 19 . . . 21 can have several different audio messages stored for transmittal to different classes of subscribers 12, 14 . . . 16.

The subscriber profile database 28 contains the actual profiles of the individual subscribers 12, 14, 16, specifying for each subscriber criteria as, for example, age, demographic data, education, sex, ethnic background, musical selections previously or simultaneously made by the subscriber, purchasing habits and the like. Finally, the large library of selectable/searchable music content is stored in the database 30. This database includes the musical work, the profile of the work, the audio identity of the artist and copyright holders, and an audio statement of the artist. Together, these databases enable the present invention to attain its objective of matching music with audio advertisement copy to be transmitted to the individual subscribers.

The operation/control block 32 contains the executable portion of the program code which runs the CPU 10 and which controls the overall operation of the system of the present invention.

Figure 2:
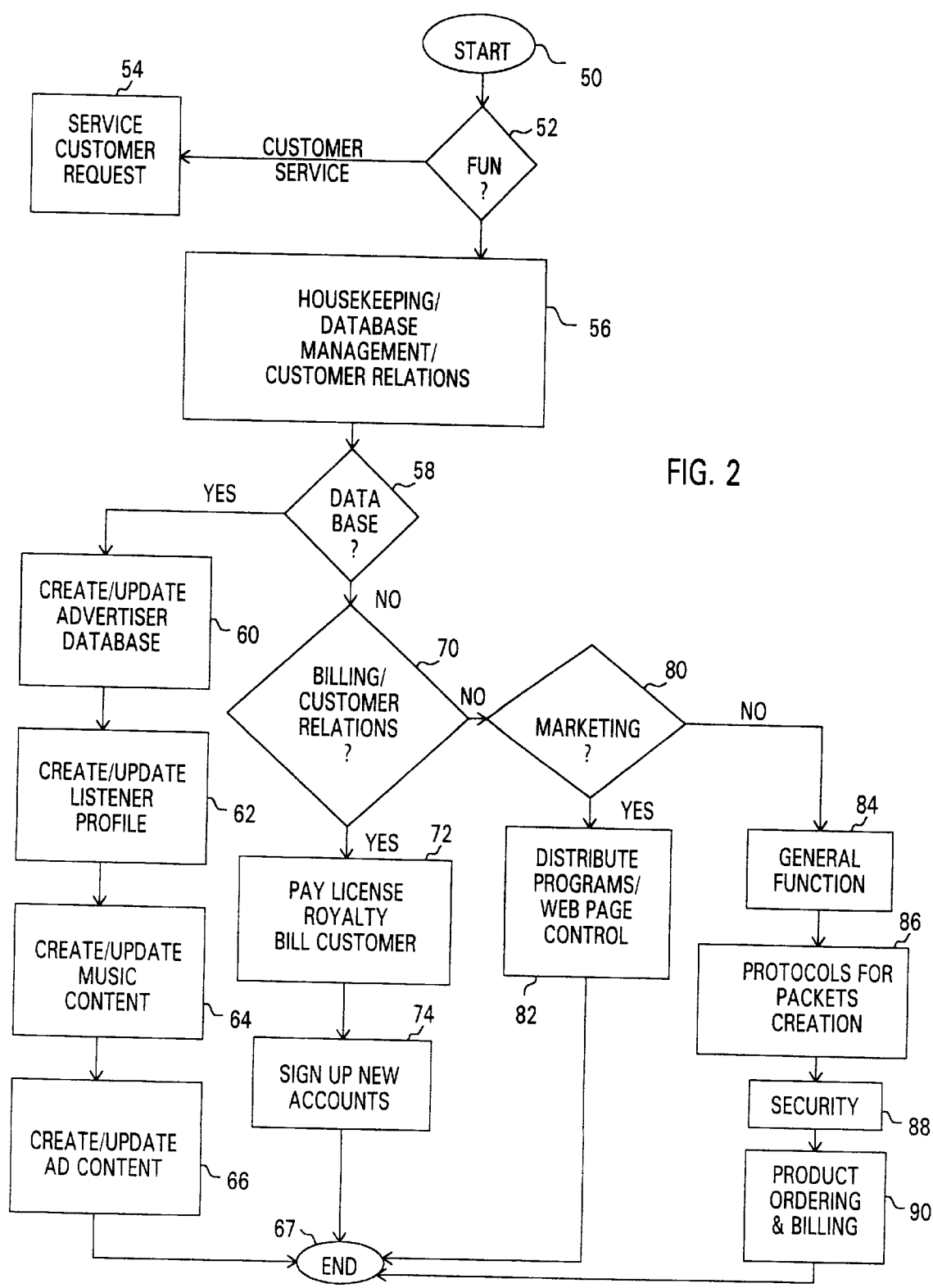
FIG. 2 is a block diagram of major software blocks of the present invention.

FIG. 2 illustrates a representative (non-limiting) flowchart of the overall software functions performed by the CPU 10 of FIG. 1. Proceeding from the starting/initialization software block 50, the program proceeds to decisional block 52 where it queries what major function is to be performed. If the major function is a response to a request from a customer for music, the program proceeds to the set of routines 54 which involve the servicing of a customer request and which are more fully described further on by reference to FIG. 3.

Otherwise, the program proceeds to software block 56 to handle general housekeeping, database management and customer and business relations. At decisional block 58, the program further determines whether the requested task is to manage the databases or other functions. If database management, the program proceeds to block 60 to execute a series of program functions involving the creation or updating of the advertiser database (element 24 of FIG. 1) which contains the names of the advertisers, individuals at advertisers to be contacted, billing information, prepaid advertising time available for each advertiser and a range of other business information and criteria. Most importantly for the present invention, this database also specifies for each particular advertiser the type, i.e. the profile of the subscribers/listeners which the particular advertiser would like to target and the advertising audio content code for each target. It is not necessary to limit the specification to a narrow class of individuals. Several classes can be identified and prioritized. Moreover, each advertiser may have different renditions of audio advertising copy to be directed to different audiences, i.e. classes of listeners.

From block 60 the program proceeds to block 62 where it performs similar functions for the subscriber/listener database 28. For each subscriber that is being added to the database or whose profile is being updated, the program lists personal data including (as already mentioned) age, education, income, musical selections previously or simultaneously made by the subscriber, purchasing habits, etc. This database can also include a field in which the subscriber specifies the type or types of music that the individual prefers, to facilitate the system's ability to present to each individual a menu of music selection which best fits the individual's preferences and music taste.

Software block 64 attends to and handles the maintenance of the actual music content. Each piece of music is classified, categorized and included in the database in either analog or digital form for future transmission to the subscribers 12, 14 . . . 16.

Similarly, at block 66 the program handles the maintenance and updating of the library of advertising copy, each piece of which has been submitted by one or another of the advertisers. A single advertiser may have stored one or several different advertisements.

While the inventors contemplate that this advertising copy will be in the form of audio/musical message, the invention is not so limited. Indeed, the invention contemplates that the advertising copy may be video information that can be played on the subscribers' computer monitors and include voice information that will play through the speakers of the subscriber's equipment. In sum, the program blocks 60, 62, 64 and 66 are responsible for the handling of all aspects of the creation, updating and modification of the large databases with which the CPU 10 of the present invention constantly communicates.

Alternatively, from decisional block 58, the program proceeds to decisional block 70 to determine whether it is necessary to take care of billing matters. If so, the program proceeds to block 72 where the program tallies accounts, listing the frequency of play and transmission of music and data stored in database 64 to subscribers. The program proceeds to block 60 to decrement advertising availability. Together, this information is useful, for example, for calculating (if necessary) royalty fees payable to the owners of the music and to provide "play" statistics for the music industry on a current and accurate basis. The block 72 further tackles the task of preparing billing data for advertisers. For example, the system may allow certain advertisers to operate without prepaid credit balances. In this case, as the advertisements of the particular advertiser are being sent to subscribers, an accounting is made of the total advertising air time used and that advertiser may be billed accordingly on a monthly, bi-monthly or other basis.

Another software task of the CPU based system 10 is executed at software block 74 which is dedicated to the tasks of interfacing, via the Internet, with existing or potential subscribers and advertisers for purposes of signing up such subscribers and advertisers, providing information regarding billing data and available music, answering general inquiries through the running of an automatic voice mail system, a web page or the like.

From decisional block 70, the program also has the option of proceeding via decisional block 80 to block 82 which is responsible for the distribution of one or several free programs which may be used for controlling the local PCs 12, 14 . . . 16 to play the received music and/or to interface with the CPU 10 (which may be made available through a web page on the Internet). Such programs downloaded from the web page, which operate in conjunction with the system of the present invention, provide various functions including allowing subscribers to automatically call up the CPU 10, automatically make music selections and the like.

Other functions provided by the software of the present invention are shown by proceeding from the decisional block 80 to block 84 which broadly designates the general class of miscellaneous functions performed in the system of the present invention. This includes, as shown in block 86, software which contains and carries out the protocols for creating packets of digital information which are to be transmitted to subscribers. Another function involves security which is handled by software block 88. Security includes the encoding and decoding of music and advertising copy that is transmitted over the Internet. It further includes encoding and decoding music in a manner that ensures that the ultimate subscribers can not separate the music from the advertising copy and/or copy it for their personal use and dissemination, in violation of licensing terms.

Software block 90 generally designates a portion of the program which interfaces with subscribers for the purposes of allowing subscribers to place orders for products or services that are advertised or presented in the advertising messages that are appended to the music. In well known manner, the various software routines eventually reach end block 67, so that the program may loop and return to the start block to permit the orderly and reliable operation thereof.

Figure 3:
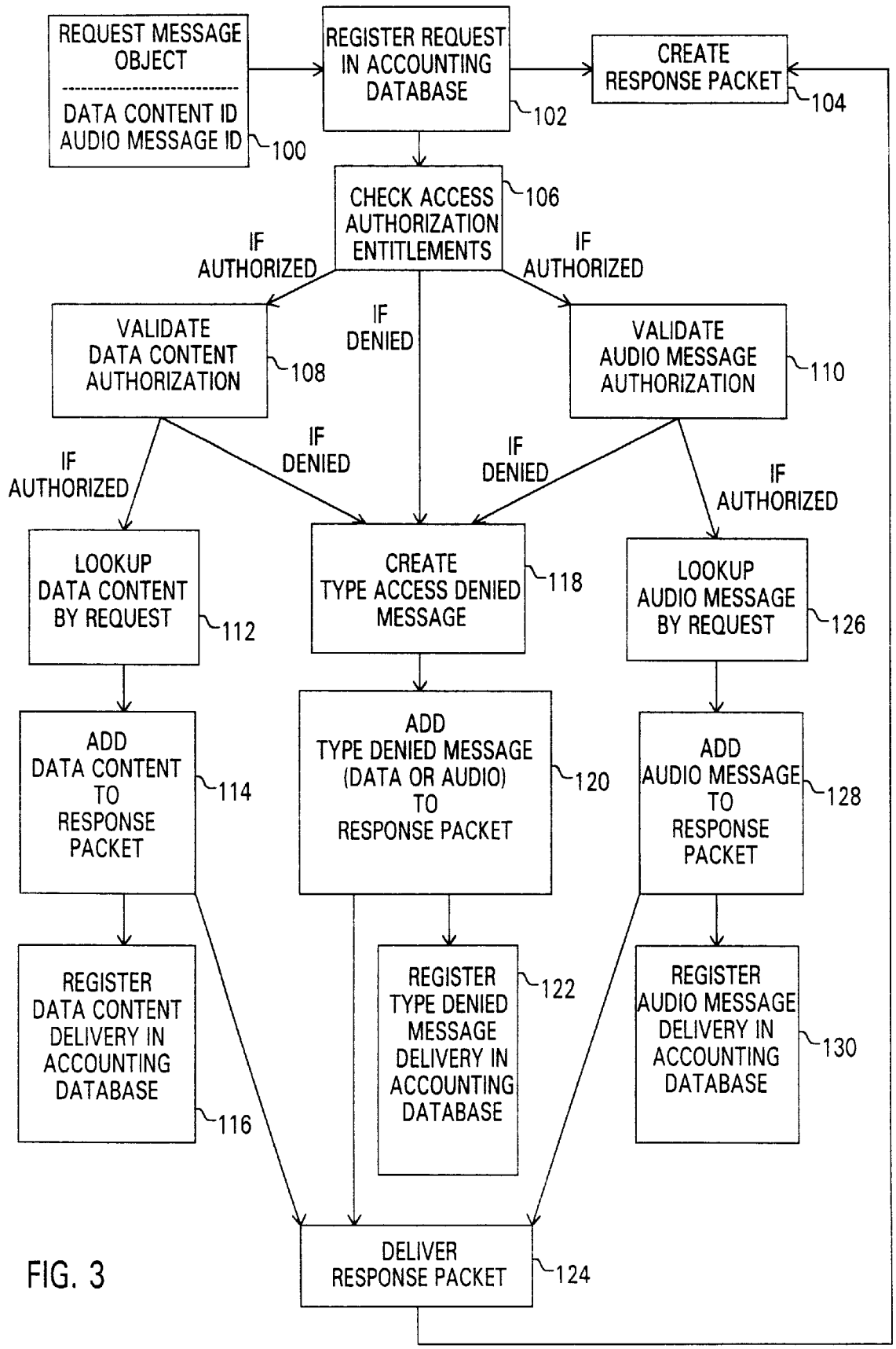
FIG. 3 shows a block diagram of the software control and protocol flow suitable for implementing a portion of the preferred embodiment of the present invention.

The specific task of responding to a subscriber's request for particular musical works and the delivery of that music to the subscriber is illustrated in the general software block diagram of FIG. 3. At block 100, the program initiates a search for the specific piece of music or other data content the subscriber has requested. The program proceeds to software block 102 where the request for the particular music/information is recorded in the accounting database and an independently running subroutine at block 104 proceeds to create a "response packet" for the individual subscriber. Such a response packet typically consists of one or more pieces of music which has been encoded/encrypted for transmittal over the Internet, to which an advertiser's message for each piece has been appended as a leader or header thereof, along with a generic or music specific voice over. Also, a message may be appended at the end of each piece of music, for example, in the form of a statement from the artist, i.e. "a wrapper".

While the response packet is being prepared at block 104, the program proceeds to block 106 to determine the availability of the selection. If available, the program proceeds to block 108 pertaining to music data selection and block 110 for advertiser selection. If an audio message is authorized to be added, the program proceeds from block 110 to validate and attend to the audio message authorization. If authorized, the audio message is looked up at block 126 (from database block 66) and is added to the response packet at block 128. Block 130 registers the audio message delivery in the accounting database at block 130, as previously described. The program proceeds to block 124 which consists of a sequence of software instructions that are responsible for adding the response packet to the queue at block 104.

As described above, simultaneously, block 108 validates content authorization by prohibiting replay of the same music in a single request and limiting the number of requests to a programmed limit, i.e., 10 selections. If the request is validated, the program proceeds to collect the musical work(s) selected and its related generic or individualized identity audio message at block 112 and 114. The program then delivers the partial response packet at block 124 where it is appended to the audio message packet and delivered to block 104 ready to receive further response packets, if any, and for delivery via block 10 to subscribers . . . 12, 14, 16.

However, if no authorization to provide a particular type of response packet is noted, the program creates at software block 118 an "access denied" message which is then transmitted without any music or other data content (other than a request to select another offering) to the subscriber at block 124. Simultaneously, a record of the inability to deliver the particular subscriber selection is registered in software block 122.

Thus, the present invention achieves its objectives by providing a software controlled microprocessor based repository in which the dossiers of all advertisers are stored and updated. The information contained in the dossiers contains the amount of advertising purchased, the amount used and the amount remaining to be used ("available allocation"), a specification of the desired consumer profile, a specification of the category of product or service to be advertised, a specification of any territorial or local time requirements or preferences, and a key to the location of the audio advertising content.

The present invention includes a software controlled microprocessor based repository in which all site content is stored and updated in either or both digital or analog form for either audio or audio/video delivery. Each item of content is catalogued defining the nature or category of the content, the identity of the source, the profile of the expected consumer or subscriber, the category of any product or service which is not to be annexed to the content, and any limitation on the availability of the content. Content is converted to a digital form for delivery over the Internet or other communication medium permitting individualized delivery. Content is encoded to prevent unauthorized duplication and to identify the subscriber to whom the content is to be delivered.

The present invention includes a software controlled microprocessor based repository in which all advertisements are stored and updated in either digital or analog form ready to be linked and transmitted. Advertisements are converted to a digital form for delivery as audio messages over the Internet or other communication medium permitting individualized delivery.

The present invention includes software controlled microprocessor based repository of digital audio content which contains generic audio messages and/or identity audio messages.

The subscriber selects the content which he or she desires to receive, and the content is placed in a queue. Based on the profile of the content, a determination is made by the system as to which advertising messages may be delivered. The system determines whether the permitted advertising message has available "allocation" and whether other required parameters have been met. From the remaining filter, the next available advertising message is selected.

The selected advertising message is then affixed to the next generic message in sequence or to the applicable identity audio message and is placed in a queue. The system automatically links the advertising message, the generic or identity message and the subscriber selected content into a single data stream along with other such streams pursuant to the subscriber's request. In constructing the stream, the system overlays the generic or identity message onto the content so that, when delivered, the audio generic or identity message and the audio content can both be heard by the subscriber simultaneously. The completed data stream, including all selections, is then delivered to the subscriber in a single stream of packets over the Internet or other communication medium, permitting individualized delivery.

There is no requirement for a one-to-one relationship between a musical piece and a class of subscribers. For example, a particular advertisement can be classified to be played to a first class of subscribers as a first choice, to a second class of subscribers as a second choice and so on. In this manner, an advertiser desiring that its messages reach broader audiences may also ear mark its advertisements to secondary classes of listeners, thus increasing the versatility and usefulness of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of using a computer network to transmit programmed information to a plurality of users, the method comprising the steps of:

storing a first database containing a number of discrete data units each of which has a related profile, the data units comprising audio content;

storing a second database containing user criteria corresponding to each of the plurality of users;

using the user criteria to identify a desired one or more of the plurality of users; and transmitting a message to the identified user, the message identifying one or more of the discrete data units, the message further identifying a method by which the identified user may be provided access to the identified discrete data units.

2. The method of claim 1, further comprising the step of storing a third database having advertiser criteria corresponding to each of at least one advertiser, wherein the desired one or more of the plurality of users are identified by matching the user criteria with at least one advertiser criterion.

3. The method of claim 1, wherein the transmitted message is an electronic mail message.

4. The method of claim 2, wherein the transmitted message is an electronic mail message.

5. A method of using a computer network to transmit programmed information to a plurality of users, the method comprising the steps of:

storing a first database containing a number of discrete data units each of which has a related profile, the data units comprising audio content;

storing a second database containing user criteria corresponding to each of the plurality of users;

storing a third database containing a variety of discrete advertising messages each of which has a related profile;

using the user criteria to identify a desired one or more of the plurality of users;

transmitting a message to the identified user, the message identifying one or more of the discrete data units;

receiving a request for one or more of the identified data units from the identified user;

appending to the requested data units, at least one of the advertising messages based upon a matching between the corresponding advertising profile and at least one user criterion to create a composite response packet in the form of a sequential data flow, the sequential data flow comprising an advertising message and a data unit; and transmitting the composite response packet to the identified user.

6. The method of claim 5, wherein the request is made by selecting a web link.

7. The method of claim 5, further comprising the step of storing a fourth database having advertiser criteria corresponding to each of at least one advertiser, wherein the desired one or more of the plurality of users are identified by matching the user criteria with at least one advertiser criterion.

8. The method of claim 7, wherein the transmitted message is an electronic mail message.

9. The method of claim 7, wherein the transmitted message is an audio message, the user interactively responding to the audio message using the computer network.

10. The method of claim 5, wherein the transmitted message is an electronic mail message.

11. The method of claim 5, wherein the transmitted message is an audio message, the user interactively responding to the audio message using the computer network.

12. A system for transmitting programmed information to a plurality of users across a computer network, the system comprising:
   a first database storing a number of discrete data units each of which has a related profile, the data units comprising musical content;
   a second database storing user criteria corresponding to each of the plurality of users;
   a central processing unit coupled to the first database and the second database, the central processing unit executing functions comprising:
      using the user criteria to identify a desired one or more of the plurality of users; and
      transmitting a message to the identified user across the computer network, the message identifying one or more of the discrete data units.

13. The system of claim 12, further comprising a third database storing advertiser criteria corresponding to each of at least one advertiser, wherein the central processing unit identifies the desired one or more of the plurality of users by matching the user criteria with at least one advertiser criterion.

14. The system of claim 13, wherein the transmitted message is an electronic mail message.

15. The system of claim 13, wherein the transmitted message is an audio message, the user interactively responding to the audio message using the computer network.

16. The system of claim 12, wherein the transmitted message is an electronic mail message.

17. The system of claim 12, wherein the transmitted message is an audio message, the user interactively responding to the audio message using the computer network.

18. A system for transmitting programmed information to a plurality of users across a computer network, the system comprising:
   a first database storing a number of discrete data units each of which has a related profile, the data units comprising musical content;
   a second database storing user criteria corresponding to each of the plurality of users;
   a third database storing a variety of discrete advertising messages each of which has a related profile;
   a central processing unit coupled to the first database, the second database and the third database, the central processing unit executing functions comprising:
      using the user criteria to identify a desired one or more of the plurality of users;
      transmitting a message to the identified user, the message identifying one or more of the discrete data units;
      receiving a request for one or more of the identified data units from the identified user;
      appending to the requested data units, at least one of the advertising messages based upon a matching between the corresponding advertising profile and at least one user criterion to create a composite response packet in the form of a sequential data flow, the sequential data flow comprising an advertising message and a data unit; and
      transmitting the composite response packet to the identified user.

19. The system of claim 18, further comprising a third database storing advertiser criteria corresponding to each of at least one advertiser, wherein the central processing unit identifies the desired one or more of the plurality of users by matching the user criteria with at least one advertiser criterion.

20. The system of claim 19, wherein the transmitted message is an electronic mail message.

21. The system of claim 19, wherein the transmitted message is an audio message, the user interactively responding to the audio message using the computer network.

22. The system of claim 18, wherein the transmitted message is an electronic mail message.

23. The system of claim 18, wherein the transmitted message is an audio message, the user interactively responding to the audio message using the computer network.

24. A method for using a communication network to deliver broadcast radio content to a user, the method comprising the steps of:
   storing at least one advertising message in a first database;
   storing the broadcast radio content in a second database;
   storing a profile corresponding to the user in a third database;
   storing advertisement criteria identifying which of the at least one advertising messages should be played to users whose profile most closely matches the advertisement criteria;
   receiving a request for broadcast radio content from a user terminal, the user terminal corresponding to the user;
   retrieving at least one advertisement from the first database based upon a matching of the corresponding advertisement criteria which most closely matches the profile corresponding to the user;
   retrieving the requested broadcast radio content from the second database;
   delivering the broadcast radio content in digital form to the user terminal;
   delivering the at least one retrieved advertisement in digital form to the user terminal; and
   playing the delivered broadcast radio content and the at least one retrieved advertisement in a sequential manner on the user terminal.

25. The method of claim 24, further comprising the step of storing a profile corresponding to the broadcast radio content in a fourth database,
   wherein the step of retrieving at least one advertisement from the first database is further based upon a matching of the advertisement criteria which most closely matches the profile corresponding to the requested broadcast radio content.

26. A method for using a communication network to deliver broadcast television content to a user, the method comprising the steps of;

storing at least one advertising message in a first database;

storing the broadcast television content in a second database;

storing a profile corresponding to the user in a third database;

storing advertisement criteria identifying which of the at least one advertising messages should be played to users whose profile most closely matches the advertisement criteria;

receiving a request for broadcast television content from a user terminal, the user terminal corresponding to the user;

retrieving at least one advertisement from the first database based upon a matching of the corresponding advertisement criteria which most closely matches the profile corresponding to the user;

retrieving the requested broadcast television content from the second database;

delivering the broadcast television content in digital form to the user terminal;

delivering the at least one retrieved advertisement in digital form to the user terminal; and playing the delivered broadcast television content and the at least one retrieved advertisement in a sequential manner on the user terminal.

27. The method of claim 26, further comprising the step of storing a profile corresponding to the broadcast television content in a fourth database, wherein the step of retrieving at least one advertisement from the first database is further based upon a matching of the advertisement criteria which most closely matches the profile corresponding to the requested broadcast television content.

28. A method of delivering broadcast radio content to at least one user, comprising:

storing at least one advertising message in a first database;

storing the broadcast radio content in a second database;

storing a profile corresponding to the user in a third database;

storing advertisement criteria identifying which of the at least one advertising messages should be played to users whose profile most closely matches the advertisement criteria;

receiving a request for broadcast radio content from a user terminal, the user terminal corresponding to the user;

retrieving at least one advertisement from the first database based upon a matching of the corresponding advertisement criteria with the most closely matching profile corresponding to the user;

appending the retrieved at least one advertisement to the requested broadcast radio content;

delivering the appended retrieved at least one advertisement and requested broadcast radio content to the user.

29. The method of claim 28, further comprising the step of storing a profile corresponding to the broadcast radio content in a fourth database, wherein the step of retrieving at least one advertisement from the first database is further based upon a matching of the advertisement criteria with the most closely matching profile corresponding to the requested broadcast radio content.

30. A method of delivering broadcast television content to at least one user, comprising:

storing at least one advertising message in a first database;

storing the broadcast television content in a second database;

storing a profile corresponding to the user in a third database;

storing advertisement criteria identifying which of the at least one advertising messages should be played to users whose profile most closely matches the advertisement criteria;

receiving a request for broadcast television content from a user terminal, the user terminal corresponding to the user;

retrieving at least one advertisement from the first database based upon a matching of the corresponding advertisement criteria with the most closely matching profile corresponding to the user;

appending the retrieved at least one advertisement to the requested broadcast television content;

delivering the appended retrieved at least one advertisement and requested broadcast television content to the user.

31. The method of claim 30, further comprising the step of storing a profile corresponding to the broadcast television content in a fourth database, wherein the step of retrieving at least one advertisement from the first database is further based upon a matching of the advertisement criteria with the most closely matching profile corresponding to the requested broadcast television content.

32. A system for playing selected broadcast radio content to at least one user, the system comprising:

at least one database storing at least one advertising message, broadcast radio content, a profile corresponding to the user and advertisement criteria identifying which of the at least one advertising messages should be played to users whose profile most closely matches the advertisement criteria; and a central processing unit, the central processing unit performing the functions of:
receiving a request for broadcast radio content from a user terminal corresponding to the user
retrieving at least one advertisement from the database based upon a matching of the corresponding advertisement criteria with the most closely matching profile corresponding to the user and retrieving the requested broadcast radio content from the second database;
responding to the received broadcast radio content request by delivering the broadcast radio content in digital form and the at least one retrieved advertisement in digital form to the user terminal for sequential play to the user.

33. The system of claim 32, wherein the central processing unit further performs the function of storing a profile corresponding to the broadcast radio content in the at least one database, and wherein the function by which at least one advertisement is retrieved from the at least one database is further based upon a matching of the advertisement criteria with the most closely matching profile corresponding to the requested broadcast radio content.

34. A system for playing selected broadcast television content to at least one user, the system comprising:

at least one database storing at least one advertising message, broadcast television content, a profile corresponding to the user and advertisement criteria identifying which of the at least one advertising messages should be played to users whose profile most closely matches the advertisement criteria; and a central processing unit, the central processing unit performing the functions of:

receiving a request for broadcast television content from a user terminal corresponding to the user retrieving at least one advertisement from the database based upon a matching of the corresponding advertisement criteria with the most closely matching profile corresponding to the user and retrieving the requested broadcast television content from the second database;

responding to the received broadcast television content request by delivering the broadcast television content in digital form and the at least one retrieved advertisement in digital form to the user terminal for sequential play to the user.

35. The system of claim 34, wherein the central processing unit further performs the function of storing a profile corresponding to the broadcast television content in the at least one database, and wherein the function by which at least one advertisement is retrieved from the at least one database is further based upon a matching of the advertisement criteria with the most closely matching profile corresponding to the requested broadcast television content.

36. A method for using a communication network to deliver audio content to a user, the method comprising the steps of;

storing at least one advertising message in a first database;

storing a profile corresponding to the user;

storing advertisement criteria identifying which of the at least one advertising messages should be played to users whose profile most closely matches the advertisement criteria;

receiving a request for audio content from a user terminal, the user terminal corresponding to the user;

retrieving at least one advertisement from the database based upon a matching of the corresponding advertisement criteria with the most closely matching profile corresponding to the user;

delivering the audio content to the user terminal;

delivering the at least one retrieved advertisement to the user terminal; and sequentially playing the audio content and the at least one retrieved advertisement.

37. The method according to claim 36, wherein the profile corresponding to the user is stored in a second database.

38. A method for using a communication network to deliver multimedia content to a user, the method comprising the steps of:

storing at least one advertising message in a first database;

storing a profile corresponding to the user;

storing advertisement criteria identifying which of the at least one advertising messages should be played to users whose profile most closely matches the advertisement criteria;

receiving a request for multimedia content from a user terminal, the user terminal corresponding to the user;

retrieving at least one advertisement from the database based upon a matching of the corresponding advertisement profile with the most closely matching profile corresponding to the user;

delivering the multimedia content to the user terminal;

delivering the at least one retrieved advertisement to the user terminal; and sequentially playing the multimedia content and the at least one retrieved advertisement.

39. The method according to claim 38, wherein the profile corresponding to the user is stored in a second database.

40. A method for using a communication network to play audio content to a user, the method comprising the steps of:

storing a profile corresponding to the user in a database;

receiving a request for selected audio content from a user terminal corresponding to the user;

determining at least one advertisement to be played by the user terminal, the advertisement being determined based on the profile corresponding to the user; and providing the selected audio content and the determined advertisement to the user terminal for sequential playing to the user.

41. The method according to claim 40, wherein the at least one advertisement has a corresponding advertisement profile, and the determining step includes matching the advertisement profile with the user profile.

42. The method according to claim 40, further including the step of sequentially playing the selected audio content and the determined advertisement.

43. The method according to claim 40, wherein the determined at least one advertisement is based at least in part on a profile of the selected audio content.

44. A method for using a communication network to play multimedia content to a user, the method comprising the steps of:

storing a profile corresponding to the user in a database;

receiving a request for selected multimedia content from a user terminal corresponding to the user;

determining at least one advertisement to be played by the user terminal, the advertisement being determined based on the profile corresponding to the user; and providing the selected multimedia content and the determined advertisement to the user terminal for sequential playing to the user.

45. The method according to claim 44, wherein the at least one advertisement has a corresponding advertisement profile, and the determining step includes matching the advertisement profile with the user profile.

46. The method according to claim 44, further including the step of sequentially playing the selected multimedia content and the determined advertisement.

47. The method according to claim 44, wherein the determined at least one advertisement is based at least in part on a profile of the selected multimedia content.

48. A method for transmitting and receiving programmed information between a user terminal and a server, the method comprising the steps of:

storing at least one data content item and at least one advertisement in at least one database, each of the at least one advertisements having a corresponding profile;

receiving a request from the user terminal to transmit at least one of the data content items from the server to the user terminal;

selecting at least one advertisement for transmission to the user terminal based on a matching between a profile associated with a user of the user terminal and the profiles corresponding to the at least one advertisement;

assembling a response packet, the response packet including a location on the server from which the at least one selected advertisement is to be retrieved and delivered to the user terminal for one of listening and listening and viewing sequentially with the requested data content; and transmitting the assembled response packet from the server to the user terminal.

* * * * *